Aug. 10, 1971  J. G. HUNT  3,598,556

METHOD OF MAKING GLASS-METAL SEALS

Filed July 23, 1968

United States Patent Office 3,598,556
Patented Aug. 10, 1971

3,598,556
METHOD OF MAKING GLASS-METAL SEALS
James G. Hunt, Framingham Center, Mass., assignor to Whittaker Corporation, Nuclear Metals Division, West Concord, Mass.
Filed July 23, 1968, Ser. No. 746,921
Int. Cl. C03c 29/00
U.S. Cl. 65—59                                   8 Claims

ABSTRACT OF THE DISCLOSURE

A method of making glass-metal seals wherein a metal rod is inserted into an elongated hole in a glass matrix. The rod and matrix composite is then inserted into an extrusion billet. The composite containing billet is then heated to a temperature within the softening range of the glass matrix. The billet is then extruded to form a co-extrusion bonded glass-metal rod. Thereafter, an end, only, of the metallic rod is exposed by removing part of the glass matrix. Different arrangements of glass-metal seals can be formed by initially encasing the glass matrix in a first metallic sleeve and by inserting another metallic sleeve between the glass matrix and the first metallic sleeve.

BACKGROUND OF THE INVENTION

(a) Field of the invention

This invention relates to composites of metal and glass sealed to one another, and more particularly to glass-metal composites having a plurality of members coextrusion bonded to one another.

(b) Prior art

Glass-metal composites are articles having at least one metallic component and at least one glass component with all of the components being in some way bound together to form the article. The relationship between the various glass and metallic components is usually either decorative, as in the case of jewelry such as tie clasps, earrings, cuff links, pins, etc.; or functional, as in the case of glass-to-metal seals containing one or more conductive members or electrodes. Glass seals in general are required in ever increasing numbers, and the electronics industry in particular is constantly seeking improved glass vacuum seals containing one or more metallic electrodes.

Glass-metal composites have, until now, been made by a number of processes, the most important of which is fusion-bonding. In the fusion-bonding process, one or more metallic components and a controlled amount of glass, glass powder, and/or porous glass preshapes are assembled within a container or shroud, which is then passed into a controlled hot zone. The assembly is heated until the glass fuses and adheres to the metal, after which it is cooled slowly to room temperature.

In general, four requirements must be met by the component materials to be employed in such a process: the glass must wet or adhere to the metal; the linear thermal expansion of the glass must closely match that of the metal over a wide range of temperatures; the metal must have no allotropic transformations within the range of the highest temperatures reached in bonding and the lowest temperature reached in service; and neither the glass nor the metal should give off gas in the temperature range noted above.

If these four general requirements have been met, and, particularly, if the glass and the metal have nearly the same coefficient of expansion, minimal differential contractions will be produced, and few, if any, stresses will be present in the composite. If, however, one or more of these limitations are not met, the glass and metal in general cannot successfully be sealed directly to each other by currently-known fusion bonding techniques.

In addition to fusion-bonding techniques, there are a number of other well-known, but rarely used, methods for producing glass-metal composites. However, in general, most of these methods require glass and metal composites meeting the four requirements set forth above for fusion bonding. It is, of course, quite obvious that there are a limited number of combinations of metals and glasses which meet these four requirements. More particularly, there are many materials which one might desire to use for a particular glass-metal composite, because of some unique physical or chemical property, only to find that the use of the desired material is precluded because it fails to meet one of the four general requirements set forth above.

SUMMARY OF THE INVENTION

It is one object of this invention to provide a glass-metal composite having at least one glass component and at least one metallic component, all of said components being coextrusion bonded together.

It is another object of this invention to provide a glass-metal composite in the form of a glass-to-metal seal wherein the coefficient of expansion of the glass components need not be the same as the coefficient of expansion of the metallic components.

It is another object of this invention to provide a glass-metal composite in the form of a glass-to-metal seal containing one or more metallic components wherein one or more of said metallic components is a metal which may undergo an allotropic transformation in previously common temperature ranges.

It is a still further object of this invention to provide a glass-metal composite in the form of a glass-to-metal seal having one or more glass components and one or more metallic components wherein it is possible to use a glass and/or a metal previously not used in composites because said metal or said glass gave off gas in the previously common temperature range.

It is yet a further object of this invention to provide a novel method of producing glass-metal composites wherein the coefficient of expansion of the glass components need not be the same as that of the metallic components; wherein the glass need not necessarily wet or adhere to the metal, at least not in the conventional manner; wherein a metal which undergoes allotropic transformation in previously common temperature ranges may be employed as the metal components; and/or wherein a glass or metal whose use was previously precluded in composites because they gave off gas in the previously common temperature ranges, may now be employed as the glass or metallic components in the form of a glass-to-metal seal.

The present invention provides a method of producing glass-metal composites in the form of a glass-to-metal seal containing one or more metallic components, wherein the four general requirements, previously required for making such glass-metal composites, can be obviated. According to the present invention, one or more metallic components, and one or more glass components or a preformed tube or shape of glass or ceramic material, having approximately the same resistance to extrusion as the metallic components, are placed in a shroud or container; the shroud or container is evacuated and sealed, and the assembly is then extruded through an extrusion die which will produce streamlined flow in the assembly to form a rod of uniformly reduced cross section. The rod is then cut to the desired length for the intended application, and any other operations which may be required are performed, e.g. if the composite is to be used as a vacuum seal, well-known machining techniques can be employed to expose the respective ends of the metallic components which are to be used as electrodes.

None of the previously noted four general requirements must necessarily be met to produce a vacuum seal by this method, though one new condition would seem to be created; that is, the glass should have approximately the same resistance to extrusion as the metal shroud. This new condition does not, however, require absolute matching of the respective resistances to extrusion and, as will be seen hereinafter, it is possible to coextrude materials having substantially different resistances to extrusion. It should be noted that as used herein, glass shall be construed to mean any glass and/or ceramic composition which otherwise fits the requirements set forth herein and metal shall be understood to include not only pure elements but also alloys of various metals, providing such alloys meet the other requirements which may be set forth herein.

One of the most important advantages of the present invention is that glass-to-metal seals can be made with metals which were previously difficult, if not impossible, to bond; one important example being a glass-to-tantalum bond. These improvements obtain because glass-metal composites can, if necessary, be made with glasses having expansion coefficients different from those of the metal. They can be made at lower temperatures, often well below the temperatures required by conventional processes which might lead to undesirable chemical side reactions or outgassing. This can be accomplished by coextruding in a metal can with an expansion coefficient higher than the glass, so that on cooling, the glass is placed under compression. To cite an extreme case, for example, glass-to-metal seals have been made according to the present invention, with the glass-metal composite being composed of a plurality of metal rods having a relatively high expansion coefficient, disposed within, and vacuum bonded to, Pyrex glass which has a relatively low coefficient of expansion. This would have been impossible with the conventional process, since only molybdenum and tungsten, and special alloys such as Kovar and Invar, with low coefficients of expansion, can be sealed by conventional methods with Pyrex or glasses similar to Pyrex.

Another advantage of the process is that wetting between the glass and the metal is not required. An oxide coating on the metal, such as was often previously required to obtain bonding between the glass and the metal, is also no longer necessary. These advantages derive from perfect fit between the metal and glass and as a result of high temperature co-deformation, and, in some cases, is further improved by the compression exerted on the components by a shroud or can.

A still further advantage of the present method is that seals can be made between glass and alloys which might outgas appreciably under conventional bonding conditions, because the glass-metal composites of the present invention are made at lower temperatures and higher pressures during extrusion. Outgassing, even if appreciable, would be tolerable in this novel glass-metal composite because much of it would be removed during billet preparation before seal formation occurs. Outgassing, if extensive, would be intolerable in the conventional process, because porosity generated in the sealing components is not healed or removed so that leaks are present in the assembly. The novel process of the present invention has an important technical advantage in this respect since it makes possible bonding between glass and the so-called "free machining" copper alloys which would appreciably outgas during conventional forming procedures. The present invention provides for the use of metals which can be machined and formed much more economically than metals such as the alloy Kovar and other common glass sealing alloys.

BRIEF DESCRIPTION OF THE DRAWINGS

The above and other objects, features and advantages of the present invention will become more apparent from the following detailed description taken in conjunction with the accompanying drawings wherein.

SPECIFIC DESCRIPTION OF THE INVENTION

Figure 1:
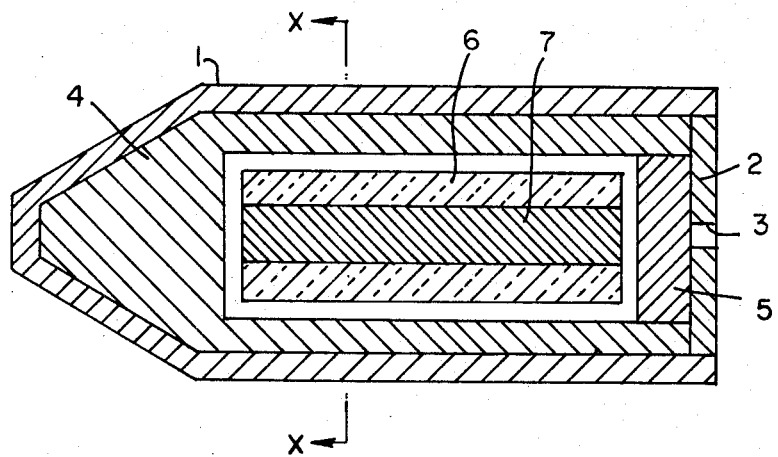
FIG. 1 is a cross-sectional, longitudinal, or side view of one extrusion billet which can be used in the practice of the present invention.

Every material which can be extruded has a relative stiffness, or resistance to extrusion, hereinafter designated K. This is a constant at any given temperature and it usually decreases with increasing temperatures. The constant for most materials over a wide temperature range is well known to those skilled in the art of extrusion technology. Insofar as the present invention is concerned, it is not necessary that the K of the glass absolutely match the K of the metal, since excellent results can be obtained where they vary as much as about 20%.

The present invention takes advantage of a number of principles or concepts well known in metal extrusion technology including:

(1) *Streamlined flow*, which is the term used in extrusion technology to describe the effect obtained when a cylindrical billet is forced through a round die with a nearly conical opening. In this situation, any point in or on the billet maintains its same relative position in the extruded rod, and therefore, the cross section of the billet will be faithfully reproduced with reduced area in the extruded rod. The process is somewhat analogous to photographic reduction.

(2) *Relative stiffness* is the resistance to deformation in extrusion and is defined by the equation, $$K=P/\ln R$$

where K is the relative stiffness or extrusion constant mentioned above, P is the pressure for extrusion, and R is the reduction in area (or the cross-sectional area of the billet divided by the cross-sectional area of the extruded rod). As previously noted, most metals have an extrusion constant at a specific temperature, and this constant for any given metal, at any given temperature, is well known to the extrusion technologist.

(3) *Coextrusion* is the simultaneous, streamlined extrusion of different materials, usually two different metals which have similar extrusion constants. Usually, materials which have extrusion constants within 20% of each other can be coextruded with excellent results.

(4) *Composite stiffness* is a property of a coextrusion billet which contains materials of different extrusion constants. The property is generally used in extruding an extremely stiff material by coextrusion with a softer material. Often, to extrude a material, at a chosen temperature and reduction in area, the force required to extrude is in excess of the press capacity, or more commonly, in excess of the stress limitations of the extrusion tools, usually about 100 t.s.i. or less This limitation can be overcome by canning or encasing the stiff material in a softer material and coextruding it under streamlined conditions. However, the softer material must not be too soft or streamlined flow will not occur. In these cases, the composite billet extrudes at a force related to its composite stiffness, which is in turn related to the fractional area and stiffness of each component in the billet. An example is the coextrusion of tungsten in a steel canning or enclosure because the tungsten is much stiffer than the steel.

On the other hand, it is sometimes desirable to extrude a soft material at a higher pressure. In this case, it is frequently possible to coextrude the softer material in a canning or enclosure of stiffer material. An example is the coextrusion of aluminum in a copper can because the former is much softer than the latter. Here again, the billet extrudes with a force related to its "composite" extrusion stiffness or constant.

(5) *Differential dissolution rate* is a phenomenon which provides a method of stripping off one or more outer coatings, or cannings, from a coextruded rod by chemical reaction. Many materials dissolve in different reagents at different rates, and, of course, some materials will not react at all with a particular reagent, while others will react and/or dissolve quite rapidly. For instance, ordinary steel is dissolved rapidly in dilute nitric acid, while titanium, stainless steel and/or zirconium are not attacked at all. Thus, when different metals are coextruded, it is often possible to remove all or part of one or several of these metals by dissolution in an appropriate reagent.

(6) *Differential thermal expansion* of different materials being extruded can have an effect on the final properties of the extruded rod. Thus, if a material having a relatively low thermal expansion coefficient is coextruded within a material having a relatively high expansion coefficient, the outer material will tend to compress the inner material during cooling. The converse is not necessarily true, however. If a material having a relatively high thermal expansion coefficient is coextruded within a material having a relatively low expansion coefficient, the same material may or may not be in tension. The stress conditions within a rod of coextruded materials are complex and depend on the relative volumes, the two cooling rates, and mechanical strengths of the constituents, as well as the respective expansion coefficients.

(7) *Viscosity of glass* is a property which has a very large influence on its mechanical properties. The viscosity of glass changes with its composition and almost continuously and logarithmically with temperature, from a condition where it is so viscous at room temperature that it "behaves" like a solid, to a condition at high temperature where it has lost much of its viscosity and "behaves" like a liquid. Having in mind the extrusion and other concepts noted above, certain viscous properties of glass will allow it to be extruded with metal. I have discovered that by selecting a glass of an appropriate stiffness or viscosity, one which approximates the stiffness of specific metals or alloys, I can coextrude that glass and the specific metal or alloy to form an improved vacuum tight glass-metal composite.

The temperature range at which a particular glass is coextrudable with a metal is a fairly narrow one. This temperature range is approximately the same as the so-called "softening point" of the glass, which is defined as the point on the viscosity temperature curve of that particular glass where the viscosity is between about $10^{7.5}$ poise to about $10^{8.0}$ poise. This point and/or temperature range is well known for most commercial glasses and can be determined by a number of methods well known to those skilled in the art.

An inherent design requirement of glass-metal composites made by the present invention is that the glass-metal composites must have a geometry such that they can be formed from a composite rod with an essentially uniform longitudinal cross section throughout essentially its entire length. The components within the composite can be coaxial (concentric) or on multiple centers. Protrusion of one or more components beyond the composite can be accomplished by any number of methods well known to the art, such as machining, selective dissolution in acids or other reagents, etc.

Have reference to the accompanying drawings, FIG. 1 is a cross-sectional side view of one extrusion billet which coud be used to produce the novel glass-metal composite of the present invention. The billet has a tubular outer metal can 1, with an aperture means at one of its ends, a lid member 2 adapted to fit into the said aperture means, and a smaller aperture means 3 in said lid whereby, after the lid is sealed in place, the inside of can 1 can be evacuated. A tubular, second metal can 4, having aperture means at one of its ends, is contained within can 1 and said second can has a lid 5 adapted to loosely fit within an aperture means at one of its ends. A glass tube 6 and a metallic rod 7, positioned within tube 6 are contained within can 4.

Figure 2:
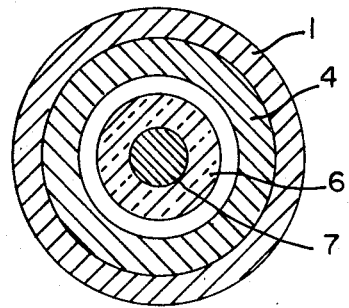
FIG. 2 is a cross-sectional, transverse, or front view of the extrusion billet of FIG. 1 on the line $x$—$x$ of FIG. 1.

FIG. 2 is a cross-sectional front view of the billet of FIG. 1 taken on the line $x$—$x$ of FIG. 1, and shows the rod 7 inside tube 6 which is contained within can 4, which is in turn contained within can 1. The cans 1 and 4 provide a protective environment for the tube 6 and rod 7 during the extrusion process and ensure streamlined flow when extruded. These cans may be selected from different materials so that the extrusion constant of the composite extrusion canister approximately matches that of the glass.

In making a glass-metal composite, the billet is assembled as shown in FIGS. 1 and 2, the lid 2 is welded into place, sealing off the aperture means of can 1, and the entire assembly is evacuated through aperture means 3, which is then sealed off using any of the methods familar to those skilled in the art. The evacuated billet is then extruded through a conical, or near conical, extrusion die of the type yielding a streamlined flow effect to the extruded rod. The extruded rod can be re-extruded if necessary until the diameter of the extruded rod is the diameter desired for the finished glass-metal composite, making due allowance, of course, for reduction in diameter during subsequent processing. After the first or additional extrusions, the extruded rod may be cut transaxially into a plurality of segments and each segment may be re-extruded to produce a plurality of extruded rods of desired reduced length and diameter. The extruded rod comprises a composite of metallic rod 7 surrounded by glass 6, in turn surrounded by the metal of second can 4, which in turn is surrounded by the metal of can 1. The extruded rod can now be finished by stripping away either by machining or selective dissolution the metal from can 1 and the metal from can 4. Where this rod is to be made into a vacuum seal, for example, the remaining outer surface of the rod may be appropriately machined to diameter and/or threaded and the ends of rod 7 may be appropriately exposed to facilitate its employment as an electrode.

Figure 3:
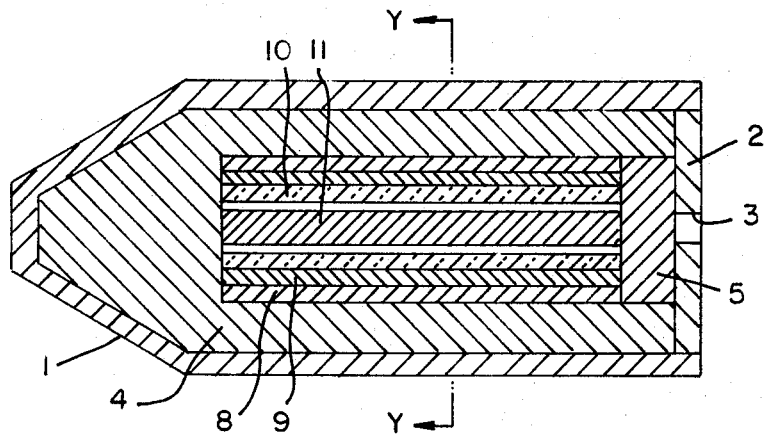
FIG. 3 is a cross-sectional, longitudinal, or side view of another extrusion billet which can be used in the practice of the present invention.

FIG. 3 is a cross-sectional side view of another extrusion billet which might be employed in practicing the present invention. As illustrated, cans 1 and 4, lids 2 and 5, and aperture 3, are substantially the same as the corresponding elements of FIG. 1. A first metal tube 8 contains a second metallic tube 9, which contains a glass tube 10, which in turn contains a metal rod 11. The assembled elements 8 through 11 are placed within cans 4 and 1 and the entire assembly is evacuated, sealed and extruded, substantially as desired in conjunction with FIG. 1 and FIG. 2.

Figure 4:
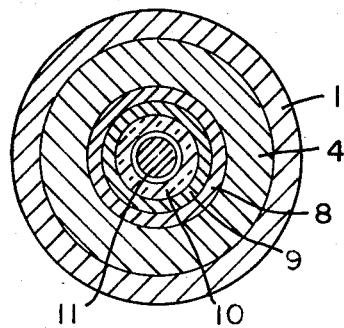
FIG. 4 is a cross-sectional, transverse, or front view of the extrusion billet of FIG. 3 on the line $y$—$y$ of FIG. 3.

FIG. 4 is a cross-sectional front view of the billet of FIG. 3 taken on the line y—y of FIG. 3. As illustrated, metal rod 11 is within glass tube 10, which is within metal tube 9, which in turn is within metal tube 8. Metal tube 8 is within can 4, which is in turn within can 1.

A billet substantially conforming to that illustrated in FIGS. 3 and 4 was prepared according to the following example which is presented by way of illustration and not by way of limitation.

EXAMPLE

A rod of high purity tantalum about 0.060 inch in diameter and 6 inches long was assembled in a tube of Corning 1720 glass, a product of the Corning Glass Company, having an outside diameter of about 0.720 inch and having an inside diameter of about 0.065 inch. The latter was placed in a sleeve of Kovar, having an inside diameter of approximately 0.720 inch and having an outside diameter of approximately 1.400 inches. The Kovar tube was then wrapped with one layer of 0.010 inch stainless steel foil. This assembly was placed in a mild steel can having an inside diameter of approximately 1.435 inches and having an outside diameter of approximately 2.0 inches, and a mild steel lid member was placed in the open end of the mild steel can. The steel can was placed in turn in a can of copper having an inside diameter of approximately 2.0 inches and having an outside diameter of approximately 3.0 inches. A copper lid was welded into place closing off the open end of the copper can and the billet was evacuated, sealed off, heated between 300° and 1000° C., and extruded by streamlined extrusion. The diameter of the orifice of the extrusion die was 0.750 inch or ¼ of the outside diameter of the copper can, and the respective elements in the extruded rod were therefore ¼ of their original diameter, and 1/16 of the original area. This is referred to as extruding at 16 times reduction. After extrusion the composite rod was converted into a vacuum seal. The copper and mild steel cans were dissolved in nitric acid. The stainless steel clad composite rod of Kovar, glass and tantalum was placed in an automatic screw machine, which was set up to machine the outside diameter, cut the seal to a desired length, and grind away the glass at the ends of the seal to expose the metal lead of the seal as illustrated in FIGS. 5 and 6 of the accompanying drawings, which will be described in more detail hereinafter.

The fabrication of a glass-to-tantalum composite as described in the example, cannot be accomplished by conventional, existing processes. In the example given, the billet was evacuated and sealed to eliminate contaminants and prevent oxidation of the tantalum. Glass 1720 and Kovar were chosen because they have similar expansion coefficients. This is not a requirement for making the seal but rather was done to facilitate subsequent heating of the seal to a relatively high temperature if this should be encountered in use. The purpose of the stainless steel foil was to allow removal of the mild steel and copper can with nitric acid, without attacking the Kovar. The purpose of the mild steel and copper is to provide a reduction in stiffness of the composite billet and allow the Kovar to be extruded at the temperature used in the example, a temperature which is relatively low for extrusion of Kovar, but a temperature at which the glass stiffness matches the composite billet stiffness. The steel and copper can perform another function. The expansion coefficient of steel and copper is higher than Kovar and Glass 1720, and glass in general for that matter. Steel and copper cool first after extrusion, being on the outside of the rod. This differential and earlier contraction of the canning causes the Kovar and glass to cool under compression. After the glass and Kovar are cold, they are rigid and the glass remains under compression to form a very stable glass-metal seal.

A portion of the extruded rod from Example 1 was examined and particular attention was given to the bonding between the glass and the metallic members. This examination revealed that a real bond, hereinafter termed a coextrusion bond, had in fact been established between the metal components and the glass components. Careful examination showed that the interface between the metal and the glass consisted of an irregular surface, and that small protrusions of glass had in fact penetrated across the interface and into the metal and small protrusions of metal had in fact penetrated into the subsurface of the glass across the interface. At no time did the glass separate as a unitary mass from the metal without leaving some glass still bonded to the surface of the metal.

Figure 5:
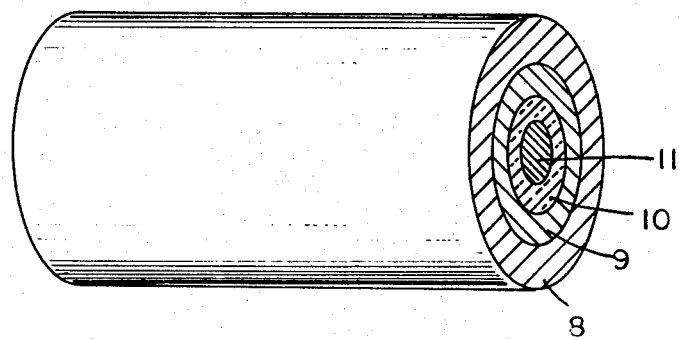
FIG. 5 is a partially perspective view of a glass-metal composite having a plurality of metallic components concentrically disposed within the composite.
Figure 6:
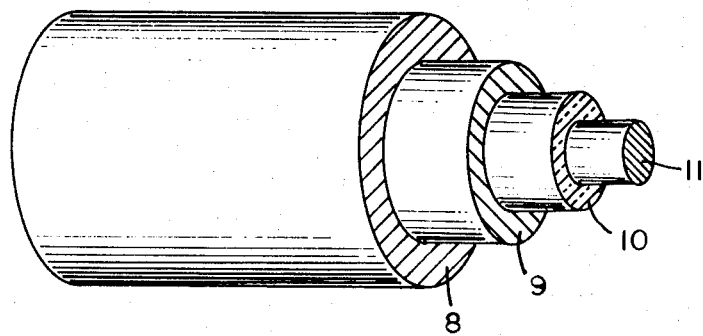
FIG. 6 is a partially perspective view of the composite of FIG. 5 with the respective metallic components exposed.

FIG. 5 is a partially perspective view of a glass-metal composite such as would be produced by extruding the billet illustrated in FIG. 3. The seal as shown has had the two layers of canning materials removed and is a seemingly solid rod having four concentric sections perfectly bonded together, the center metallic rod 11, the glass tube layer 10, the second metallic tube layer 9, and the first metallic tube layer 8.

FIG. 6 shows the glass-metal composite illustrated in FIG. 5 after a portion of the end of the glass-metal composite has been ground away to expose metal rod 11 and metal rod 9 in a manner suitable for use of the glass-metal composite as a vacuum seal.

Figure 7:
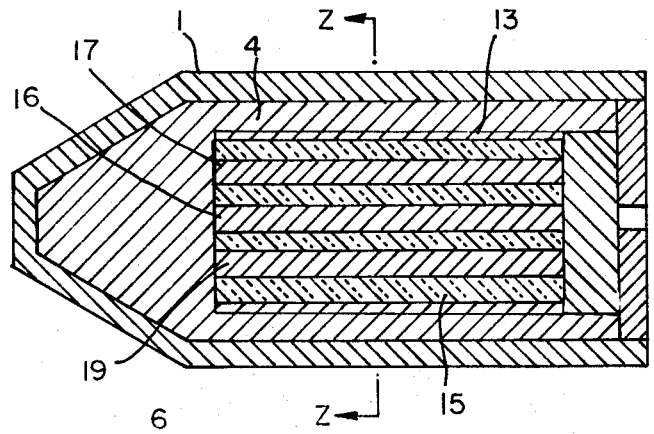
FIG. 7 is a cross-sectional side view of still another extrusion billet which may be used in the practice of the present invention.

FIG. 7 is a cross-sectional side view of still another billet which may be employed in the practice of the present invention. Cans 1 and 4, lids 2 and 5, and aperture means 3 are substantially the same as in FIG. 1 and FIG. 3. A plurality of metal rods 16–20 are inserted within predrilled bores within a cylindrical glass core 15. The glass core is then placed in a metal tube 13 which is then placed in can 4 and the billet is sealed, evacuated and extruded in a manner similar to that set forth with regard to FIG. 1.

Figure 8:
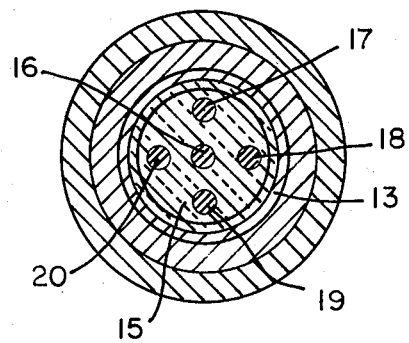
FIG. 8 is a cross-sectional longitudinal front view of the extrusion billet of FIG. 7 on the line $z$—$z$ of FIG. 7.

FIG. 8 is a cross-sectional front view on the line z—z of FIG. 7 and shows metal rods 16–20 and glass core 15 within metal tube 13 which is in turn within can 4 and can 1.

Figure 9:
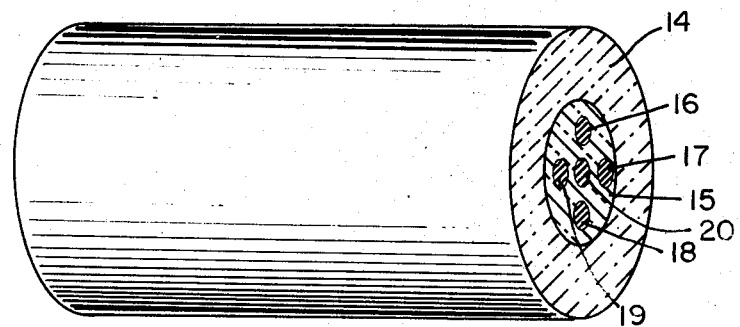
FIG. 9 is a partially perspective view of a glass-metal composite having a plurality of metallic components randomly disposed within the glass-metal composite.

FIG. 9 is a partially perspective view of a glass-metal composite which could be produced by extruding the billet illustrated in FIG. 7. The cans 1 and 4 and the shell 13 have been removed by pickling the composite in acid. The metal rods 16–20 are dispersed in a random manner through, and bonded to, the glass core 15.

Figure 10:
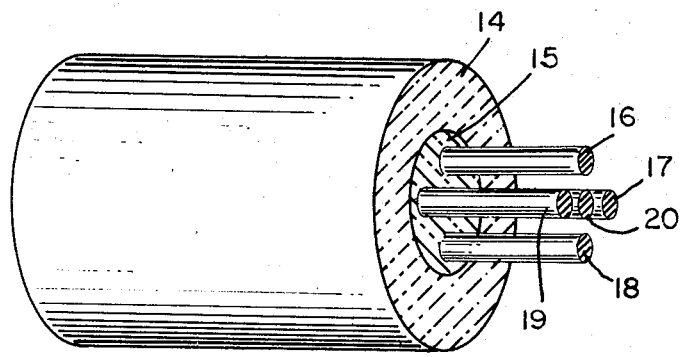
FIG. 10 is a partially perspective view of the glass-metal composite of FIG. 9 with the respective metallic components exposed.

FIG. 10 is a partially perspective view of the glass-metal composite illustrated in FIG. 9, after the glass at one end of the glass-metal composite has been partially ground or etched away to expose the metal rods 16–20 in making a glass vacuum seal, rods 16–20 becoming electrodes in the finished seal.

In addition to the large number of structures illustrated by the various figures attached hereto and described above, the present invention will also be utilized in a large number of other end-products requiring glass and metal components sealed together. As previously noted, one instance of such a product would be ornamental designs, such as those used in jewelry, e.g. glass of one or more predetermined colors, coextruded with one or more conventional jewelers metals, to produce an extruded rod which can be cut into a large number of thin discs, each having the exact same design.

More particularly, the metal component of the composite can be a long bar having the cross-sectional configuration of an initial, so that it would be possible to coextrude a gold bar having, for example, a cross-sectional configuration in the shape of the letter "N," and blue preshapes of glass, to produce an extruded rod of blue glass with a gold "N" in its center. The extruded composite rod could then be cut into a large number of identical thin discs, each having the gold letter "N" at their center. When these discs are used in making jewelry they will have not only the advantage of an improved bond between the metal component and the glass, but they will also greatly facilitate securing of the ornamental design to the metal base member of an earring, tie clasp, cuff link or the like. Until now, one of the major problems encountered by jewelers in the use of ornamental glass designs has been the difficulty of securely fastening the ornamental glass work to the base jewelry member. This is now obviated since the metal portion of the ornamental design can easily be securely fastened to the metal of the base jewelry piece by one of many well known processes.

The present invention also finds application in producing a glass-metal composite which can serve as an intermediate for the subsequent manufacture of special end-products. One example of the use of the novel composites of the present invention as an intermediate is in the manufacture of channel plates for use in the electronics industry. These channel plates are very expensive glass members having a plurality of minute channels longitudinally disposed between parallel, opposed surfaces and serving to align electrons flowing through the plate.

Channel plates may be produced by extruding a bundle of small diameter metallic rods, each disposed within a glass tube, to produce a glass-metal composite having a very large number of thin metallic rods disposed within a glass member. By subsequent re-extrusion with streamlined flow, it would be possible to reduce the diameter of the metallic rods to a point where they would be equal to the desired diameter of the apertures in the channel plate. At this point, the metallic rods would have been reduced to a diameter measured in angstrom units and they could be easily removed by selective dissolution, using an acid which would dissolve the wires without attacking the glass. At this point, the long body of glass, having a plurality of minute apertures, could be cut into disc-shaped channel plates at a great saving over the cost of producing similar channel plates by conventional methods currently available. It will, of course, be obvious that the extruded composite could be cut into the disc-like channel plates before removal of the wires where the cutting procedure would be facilitated by the additional strength of the wires being present during cutting. In the event that this alternative procedure were followed, the channel plates would be cut and the metallic component of the composite would then be removed by selective dissolution in an appropriate acid.

The procedure followed above to produce electronic channel plates could also be used to produce any number of other filter designs and could also be used to produce building materials, such as tiles, where an ornamental design is desired; or even buttons having a monogrammed or ornamental design.

If we were to take the same intermediate used in producing the channel plate described above but dissolved away the glass instead of the metal, we could produce very fine wire of a diameter not heretofore obtainable in many metals, e.g., wires of less than twenty-five microns or wires down to as small a diameter as five microns of metals such as beryllium, super alloys such as permalloy, and heat resistant high strength super alloys. The term permalloy refers to any of the class of iron-nickel base alloys such as those described on page 591 of the Metals Handbook, 1948, published by the American Society for Metals, Metal Park, Novelty, Ohio (April 1960 printing) Table 2; and the high strength heat resistant super alloys or materials such as Inconel X, a product of the International Nickel Company, New York, N.Y. Using a novel intermediate of that described above, it would be possible to produce wires of any of the above noted metals in diameters as small as five microns as opposed to previous available wires of these materials which were never made in diameters less than one mil (25 microns).

The most effective procedure for making metal fibers of metals such as those noted above has until now been a series of coextrusions and/or co-rollings and/or co-drawings in a can or matrix material. It was the matrix material which was the limitation until now because as the diameter of the fiber or wire material was reduced, it tended to react with, or become dissolved in, the matrix metal or material heretofore available for coextrusion with it. Using the novel intermediate described above, it would be possible to produce fine wires which would neither dissolve in, nor react with, the glass; and the glass could be simply removed either by chemical treatment with a reagent such as sodium hydroxide or by mechanical treatment such as swaging the entire intermediate, breaking down the glass and then washing away the glass powder which would be formed during the swaging operation.

It will then be clearly seen that the novel product and method of the present invention will find application in any end-product or intermediate product which necessitates, or is improved by, exceptional bonding between glass and metal components, and/or by an unusually uniform cross-sectional configuration of glass and metal components particularly when the individual component has essentially a minute, complex or decorative cross-sectional area, providing, of course, that the product can be extruded, and that in extrusion it will have essentially the same cross-sectional configuration through all its entire longitudinal lengths.

It will be obvious to those skilled in the art that many changes, alterations and substitutions can be made without departing from the spirit or scope of the invention herein disclosed, and it is my intention to be limited only by the appended claims.

I claim:
1. A method of manufacturing glass-metal composites having at least one metallic component positioned within a glass matrix, comprising:
   inserting at least one metallic rod into a glass matrix having an elongated hole therethrough for each said metallic rod for slidably receiving said metallic rod;
   introducing said glass matrix with said metallic rod inserted therein into an extrusion billet;
   heating said extrusion billet containing said glass matrix to a temperature within the softening temperature range of the glass forming said glass matrix;
   extruding said heated extrusion billet at least once until the desired reduction ratio is obtained to produce a coextrusion bonded glass-metal rod;
   cooling said glass-metal extruded rod to ambient temperature; and
   removing a predetermined amount of said extruded glass matrix to expose only an end of said metallic rod.

2. The method of claim 1 wherein said softening temperature range for said glass is within the temperature range of about 300° C. to about 1000° C.

3. The method of claim 1 wherein said metal rod is formed of tantalum.

4. The method of claim 3 wherein said reduction ratio is about 16:1.

5. The method of claim 1 including the additional steps of:
   slidably encasing said glass matrix in a first metallic sleeve receivable in said extrusion billet, the metal forming said first metallic sleeve having a higher coefficient of thermal expansion than said glass to cause said glass to cool under compression, said first metallic sleeve, after said extrusion, forming an outer sleeve suitable for machining.

6. The method of claim 5 including inserting a second metallic sleeve slidably between said glass matrix and said first metallic sleeve prior to said heating step, the metal forming said second metallic sleeve having a coefficient of thermal expansion substantially the same as said glass.

7. The method of claim 1 wherein said glass-metal extruded rod is transaxially cut into a plurality of segments and said segments are further extruded.

8. The method of claim 1 wherein said billet is evacuated and sealed after said glass matrix is introduced therein.

References Cited

UNITED STATES PATENTS

| | | | |
|---|---|---|---|
| 2,628,417 | 2/1953 | Peyches | 29—423 |
| 3,413,707 | 12/1968 | Klein et al. | 29—419 |

S. LEON BASHORE, Primary Examiner

S. R. FRIEDMAN, Assistant Examiner

U.S. Cl. X.R.

65—61; 72—253; 264—176R